United States Patent [19]

Beltzig

[11] Patent Number: 4,943,046
[45] Date of Patent: Jul. 24, 1990

[54] PLAYGROUND APPARATUS

[75] Inventor: Günter Beltzig, Hohenwart, Fed. Rep. of Germany

[73] Assignee: Sutcliffe Group Limited, England

[21] Appl. No.: 313,711

[22] Filed: Feb. 22, 1989

[30] Foreign Application Priority Data

Mar. 1, 1988 [GB] United Kingdom ............... 8804782
Feb. 13, 1989 [GB] United Kingdom ............... 8903170

[51] Int. Cl.$^5$ ............................................. A63G 9/00
[52] U.S. Cl. ............................. 272/1 R; 272/65; 272/85; 272/113; 182/138
[58] Field of Search ................ 272/56.5 R, 1 R, 113, 272/85, 65; 182/138–140; 5/481

[56] References Cited

U.S. PATENT DOCUMENTS 3,518,707  7/1970  Nissen ........................... 182/139 X
4,423,102  12/1903  Danton ............................... 5/481
4,478,410  10/1984  Ziegler, Jr. ........................ 272/85

FOREIGN PATENT DOCUMENTS 2040697  9/1980  United Kingdom ............... 272/85
2063082  6/1981  United Kingdom ............... 272/85

Primary Examiner—Richard E. Chilcot, Jr.
Attorney, Agent, or Firm—Silverman, Cass & Singer, Ltd.

[57] ABSTRACT

Apparatus (300) for use in a children's playground comprises a rigid ground-mountable frame (301) and at least one chain (302) having an end attached to the frame (301), and is characterized in that the at least one chain (302) is a chain (2) embedded in a resilient polymeric material (3) and the disposition of the links (4) of the chain (2) is such as to permit the chain (2) and polymeric material (3) structure to stretch resiliently under load.

A safety structure (20) for use as a safety net comprises a web of resilient polymeric material (21), and is characterized in that chains (22, 23) are embedded in the polymeric material (21), the disposition of the links (27) of the chains (22, 23) being such as to permit the structure to stretch resiliently under load.

20 Claims, 4 Drawing Sheets

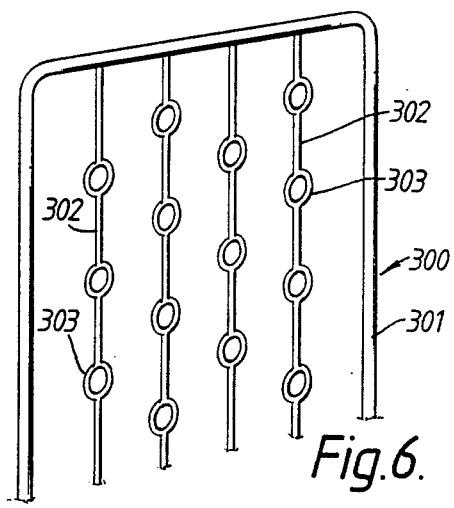
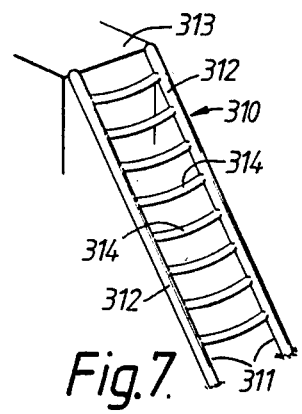
Fig.6.
Fig.7.
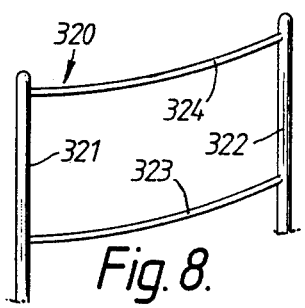
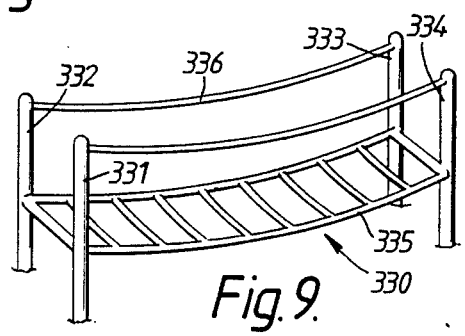
Fig.8.
Fig.9.
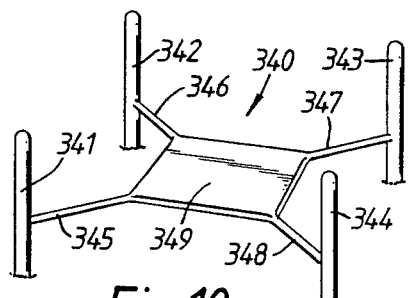
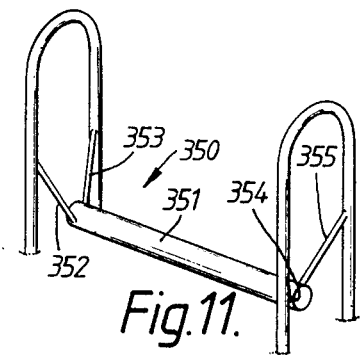
Fig.10.
Fig.11.

PLAYGROUND APPARATUS

This invention relates to playground apparatus.

In various kinds of equipment for use by children in a playground, there is a need for a structure to support the weight of the child in tension. One example is a swing seat of belt type such as that described in our laid-open German patent application No. DE-OS 30 37 387.6. Care has to be taken to ensure, as far as possible that such equipment shall be safe and cannot cause serious damage or injury to a child as a result of mis-use, vandalism or wear or breakage of the equipment. One of the safety measures adopted in the swing seat just mentioned is a reinforcement in the form of a metal cable but even that is not entirely satisfactory since a determined effort at vandalism by repeated back and forth flexing of the seat can cause strands of the cable to break so producing potentially hazardous wire ends. A further difficulty is that the measures taken to ensure safety of the equipment in use must not add so appreciably to manufacturing costs that the equipment cannot be sold a reasonable price.

The present invention provides apparatus for use in a children's playground, the apparatus comprising a rigid ground-mountable frame and at least one chain having an end attached to the frame, wherein the at least one chain is a chain embedded in a resilient polymeric material and the disposition of the links of the chain is such as to permit the chain and polymeric material structure to stretch resiliently under load.

The chain embedded in the polymeric material constitutes a structure for supporting a load in tension and providing resiliency. Such embedded chain has a number of applications in playground equipment and is inherently safe because chain is capable of great strength, is not susceptible to breakage by repeated back and forth flexing and cannot fray into sharp ends. Moreover, the fact that the chain is embedded in the polymeric material, as opposed to being merely sheathed by it, makes it more difficult for vandals to attack. Another advantage is that chain is relatively cheap and readily available.

Advantageously, the resilient polymeric material is bonded to the chain. In this way, the structure can be made even more resistant to vandalism.

The chain may comprise a series of simple links. Other types of chain, such as bicycle chain and chains where the links are formed in pairs, are, of course, available commercially but simple links can provide desired strength at low cost.

Because the disposition of the links of the chain is such as to permit the structure to stretch under load, a structure is obtained which can stretch until the links take up positions in which no further stretching is possible and so limit unsafe over-stretching of the polymeric material. One way to achieve that result is to arrange that those ends, which lie within respective adjacent links, of at least some of the links in the chain are spaced from the adjacent links to permit the structure to stretch resiliently under load. It is preferable but not essential that the resilient polymeric material be bonded to the chain. The said spacings could be, for example, at least 3 millimeters, at least 5 millimeters, at least 7 millimeters, or at least 10 millimeters according to the degree of stretch wanted and the size of links used in the chain. Some, most or all of the links may be arranged so that they touch the next-but-one link(s) as to make the said spacings a maximum but that is not essential.

Preferably, the chain is made of metal, for example, steel, preferably of at least 2.5 millimeters diameter. Preferably, the metal chain is made up of simple links each of length at least 15 millimeters. Preferably, the chain is made up of links each of length less than 80 millimeters. By these means desired strength and flexibility can be achieved.

Preferably, the polymeric material is a moulded rubber material Information on the use of mouldable rubber materials in conjunction with metal reinforcement is to be found in the German specification mentioned above and also in our British Pat. No. 1 535 728.

The apparatus may be a swing and comprise a rigid body suspended from the frame by the at least one chain.

One form the swing may take is one in which the embedded chain is used for the two suspension chains of a child's swing of otherwise conventional form. Children often misuse a swing with an ordinary chain suspension by repeatedly throwing the seat up and over the top suspension bar so that the chain becomes wrapped around the bar. The polymeric material in which the chain is embedded prevents such misuse of the swing and enables a child to get a good grip on the suspension without the risk of the child's fingers entering the links. Because the embedded chain structure is capable of stretching resiliently an extra sensation is added to the amusement of using a swing but the chain puts a safe limit on the amount of stretch possible in the suspension. That resilient stretching of the embedded chain may be used in a large number of different forms of playground apparatus to provide different sensations from those obtained using playground apparatus of conventional form.

The apparatus may be a climbing frame and comprise at least one embedded chain mounted on the frame. The embedded chain may be arranged as one or more vertical climbing ropes, fixed or free at their lower ends.

The apparatus may include a ladder-like structure of which the rungs are made of the embedded chain. The ladder-like structure may be used upright or horizontally as a walk-way.

The apparatus may comprise a rigid body pivotally-mounted on the frame, and stop members to limit the movement of the body comprising lengths of the embedded chain. The rigid body may, for example, be the beam of a see-saw and the embedded chain provides a gentle stop at the limits of movement of the rigid body and a restoring force back again.

The apparatus may comprise a ridable body mounted on the frame by lengths of the embedded chain. Thus, the embedded chain mounts the ridable body which has an interesting spring-mounted feel to it when ridden.

The apparatus may comprise a body mounted on the frame as a trampoline or spring-board by lengths of the embedded chain. The resilient stretchability of the embedded chain provides or contributes to the resilient action of this form of apparatus.

The invention also provides a safety structure for use as a safety net comprising a web of resilient polymeric material in which chains are embedded in the polymeric material, the disposition of the links of the chains being such as to permit the structure to stretch under load. Because the structure can stretch resiliently under load, it is capable of safely absorbing energy from a falling child or of being used in the manner of a trampoline. It is preferable but not essential that the resilient polymeric material be bonded to the chains.

Preferably, the ends of the chains project from the web and provide a means for suspension of the safety structure. Such projecting ends also permit several safety structures to be joined to each other to make a safety structure of large area.

Advantageously, those ends, which lie within respective adjacent links, of at least some of the links in the chain are spaced from the said adjacent links to permit the structure to stretch under load. This is a particularly simple way of enabling the structure to stretch under load. The said spacings could be, for example, at least 3 millimeters, at least 5 millimeters, at least 7 millimeters, or at least 10 millimeters according to the degree of stretch wanted and the size of links used in the chain. Some, most or all of the links may be arranged so that they touch the next-but-one link(s) as to make the said spacings a maximum but that is not essential.

Preferably, a first set of parallel chains crosses a second set of parallel chains and the two sets are interlinked at the crossing points. By this means a safety structure of large area can be made relatively easily and cheaply. The two sets of chains may be arranged substantially at right angles.

Advantageously, at each crossing point a ring-shaped link is provided and those ends, within the ring-shaped link, of the adjacent links are spaced from the ring-shaped link. That is a convenient way of enabling the structure to stretch under load.

Preferably, the said links adjacent to the ring-shaped links are linked one to the next by one or more links smaller than the said links adjacent to the ring-shaped links. In this way, the size of the links is matched to the task they have to form, big links being used to provide the stretch and smaller links to carry out a connecting function.

Advantageously, the web is apertured in the spaces between chains. That has the advantages of saving material, allowing water to drain away and providing an aesthetically satisfying appearance. Instead, the web may be apertured within the ring-shaped links. In that way, the ring-shaped links limit the expansibility of the apertures to reduce any tendency they may have to grip an object or limb thrust through them.

The invention also provides a method of making a structure comprising a chain embedded in polymeric material, the method comprising supporting the chain on polymeric material mechanically stable during curing whilst curing polymeric material about the chain and stable material. Pre-cured polymeric material is an example of a stable polymeric material for this purpose and another example is a light nylon filament or cord. Neither example would interfere with an ability of the finished structure to stretch for the nylon could slip and/or break and the pre-cured material could stretch or break.

Apparatus for use in a children's playground constructed in accordance with the invention will now be described, by way of example only, with reference to the accompanying drawings, in which:

FIGS. 6 to 19 are each a diagrammatic perspective view of a respective playground apparatus embodying the invention.

Figure 1:
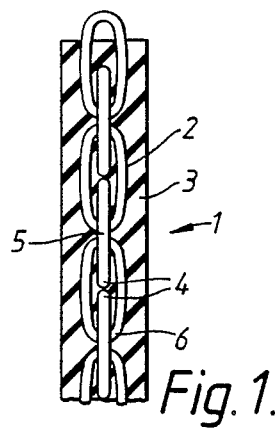
FIG. 1 shows a section of a part of a suspension chain for a swing seat.

Referring to the drawings, a suspension chain 1 for a child's swing comprises a steel chain 2 embedded in and preferably bonded to moulded rubber 3 of circular outer section. The steel chain 2 is made up of a series of simple links 4 each of about 6.5 millimeter diameter metal and of length about 25 millimeter and welded closed. Such steel chain is readily available commercially. The chain 2 is moulded with its links pushed towards one another so that the end, for example 4, of a link, for example 5, within an adjacent link, for example 6, is spaced from the adjacent link (6).

The suspension chain 1 is made by threading a cord of cured rubber or other suitable material such as a nylon filament, through the links of a steel chain, holding the cord 2 taut, pushing the links of the chain together to make the chain as short as possible, surrounding the chain (still on the held-taut cord) with uncured rubber in a mould, and subjecting the rubber to heat and pressure to cure the rubber. Preferably, the chain is pre-treated to enhance the adhesion of rubber to the metal. The cured rubber cord is used to hold the links of the chain in position and to ensure that the chain does not sink through the rubber during curing and become visible at the outside of the finished suspension chain. Such suspension is not, however, essential as good results can be obtained by simply placing the chain (with the links pushed together) on top of a layer of rubber, or even directly, on the floor of the mould.

Figure 2:
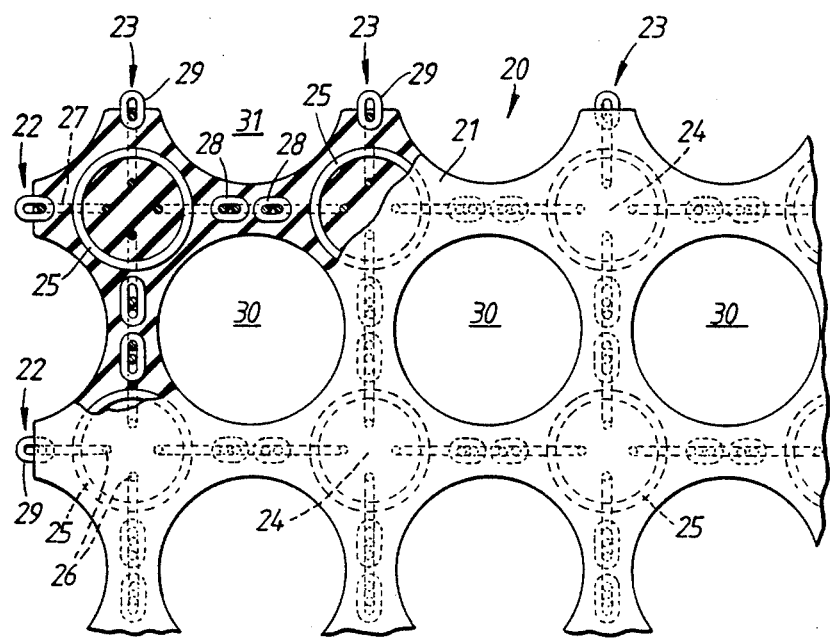
FIG. 2 shows, partly in section, a top view of part of a safety net according to the invention.

FIG. 2 shows a safety structure 20 according to the invention for use as a safety net or in the manner of a trampoline. The structure 20 comprises a web of moulded rubber 21 about 3000 millimeters square in outline and 15 millimeters thick in which two sets 22 and 23 of parallel steel chains with welded-closed links are embedded and preferably bonded to the rubber. The sets of chains 22 and 23 are arranged substantially at right angles and are interlinked at their crossing points 24. At each crossing point 24 a ring-shaped link 25 of about 50 millimeters diameter is provided and the ends 26 of adjacent links 27 of ordinary elongate form of length about 30 millimeters are spaced by about 10 millimeters from the ring-shaped link. The links 27 are linked to each other by by pairs of smaller links 28 of length about 20 millimeters. At the outside edges of the web 21, links 29, inter-linked with the outermost ones of the links 27, project to enable the structure 20 to be suspended or connected to another like structure. The web 21 has circular apertures 30 of diameter about 80 millimeters in the spaces between chains and the outer edges of the structure 20 have corresponding scallops 31.

The safety structure 20 is manufactured in a similar manner to the several ways mentioned in respect of the suspension chain 1, for example, by using cured rubber elements to position the links of the chains.

Figure 3:
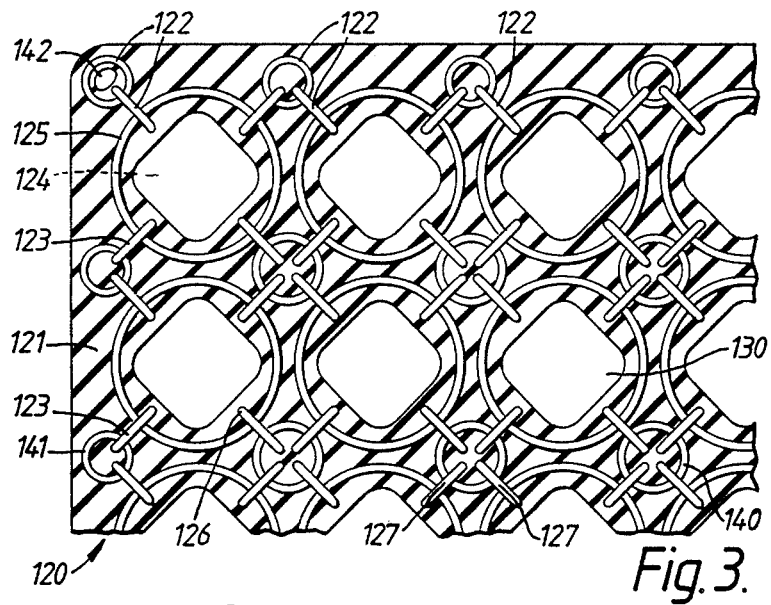
FIG. 3 shows a section through part of another safety net according to the invention.
Figure 4:
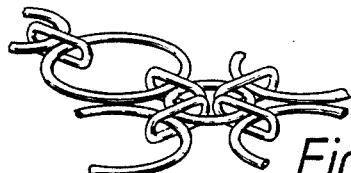
FIG. 4 is a perspective view of chain links used in the safety net of FIG. 3.

FIG. 3 shows a second safety structure 120 very similar to the safety structure 20 and therefore only the differences will be described with corresponding elements being identified by corresponding elements increased by 100. In the FIG. 3 safety structure, the two sets of parallel steel chains 122 and 123 run diagonally instead of parallel to the walls of the safety structure. The ring shaped links 125 are of large diameter relative to the other links and surround the apertures 130 which are here of a rounded square shape. The links 28 and 29 of FIG. 2 are here replaced by a single ring shaped link 140 and the links 29 are replaced by ring shaped links 141 entirely within the moulded rubber 121. At the corners of the safety structure a respective aperture 142 passes through each link 141 for mounting purposes. The safety structure of FIG. 3 has the advantage over the safety structure of FIG. 2 that the apertures in the structure have greater dimensional stability because of the links 125 encircling them. Thus, the slight possibility that a limb of a child might be forced and gripped, to the child's alarm, by the resiliency of the structure is avoided in the FIG. 3 structure.

Figure 5:
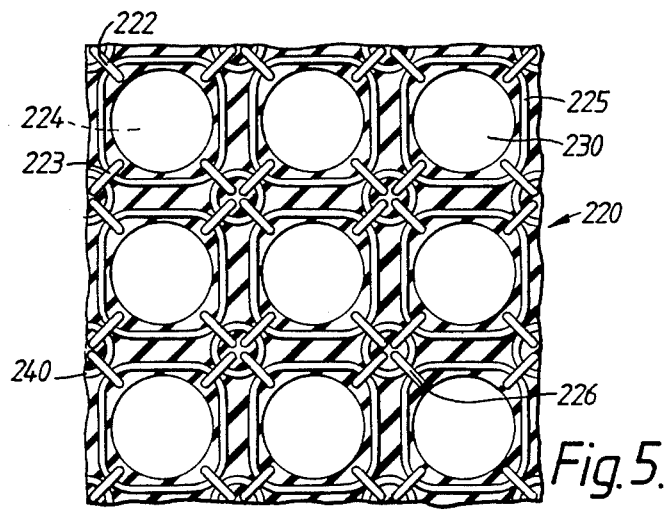
FIG. 5 shows a section through part of another safety net according to the invention.

The safety structure 220 of FIG. 5 is very similar to that of FIG. 3 and corresponding elements have been given corresponding reference numerals increased by a further 100. In FIG. 5, the large diameter rings defining the ring shaped links 225 have the shapes of rounded squares and the apertures 230 which they encircle are circular. In the FIG. 5 construction, the small amount of rubber within the links 225 ensures that the apertures 230 have even greater dimensional stability.

The remaining Figures show how lengths of the suspension chain described earlier for use with a child's swing can be applied in various ways to make other forms of playground apparatus. For convenience of manufacture, the chain can be produced in lengths of, say, 1 meter which are then joined end to end to make the length of chain desired.

FIG. 6 shows a climbing frame 300 in which a tubular steel frame 301 in the form of an inverted "U", the cross-piece of the "U" being straight, is mounted in the ground and fitted with one or more ropes 302. The or each rope 302 is made up of a number of sections of the suspension chain described earlier with large rings 303 at the joins of the sections. The bottom end(s) of the rope(s) 302 can be fixed into the ground or left free.

FIG. 7 shows a play ladder 310 in which a rigid frame 311 comprising a pair of side members 312 mounted between the ground and a high structure 313 and sections of the suspension chain described earlier make up the rungs 314 of the ladder.

FIG. 8 shows a balancing rope with handrail play apparatus 320 in which a rigid ground mounted frame is in the form of two posts 321 and 322. A balancing rope 323 and a handrail 324, each constituted by a length of the suspension chain described earlier, are arranged horizontally between the posts 321 and 322.

FIG. 9 shows a play rope bridge 330 in which a rigid ground mounted frame in the form of four posts 331, 332, 333 and 334 is provided. A ladder like structure 335 and two handrails 336 are made up from sections of the suspension chain described earlier and arranged between pairs of the posts 331–334.

FIG. 10 shows a trampoline apparatus 340 in which a rigid ground mounted frame in the form of four posts 341, 342, 343 and 344 is used with four sections 345, 346, 347 and 348 of the suspension chain described earlier to suspend a square mat by its corners for use as a trampoline.

FIG. 11 shows a playground apparatus 350 on which children can play balancing games. The apparatus 350 comprises a rigid ground mounted frame in the form of two inverted "U"-shaped frames between which a beam 351 is mounted at each end by a respective pair of sections 352, 353; 354, 355 of the suspension chain described earlier, each pair forming a "V"-shaped suspension.

Figure 12:
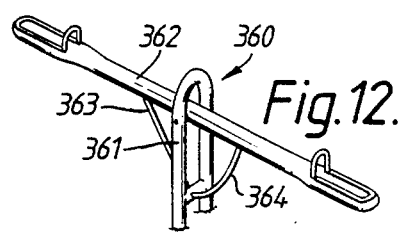

FIG. 12 shows a see-saw 360 in which a rigid ground mounted frame 361 carries the beam 362 of the see-saw and two sections 363 and 364 of the suspension chair described earlier are attached between the frame 362 and the beam 362 as stop members to limit the movement of the beam before an end hits the ground.

Figure 13:
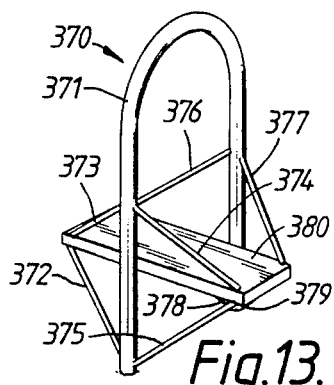

FIG. 13 shows a jumping beam apparatus 370 in which a rigid ground mounted frame 371 in the form of an inverted "U" is used in conjunction with eight sections 372, 373, 374 and 375; 376, 377, 378 and 379 of the suspension chain described earlier to mount a rectangular platform 380 by its corners, the suspension sections forming "V"-shaped mountings above, below and each side of the platform.

Figure 14:
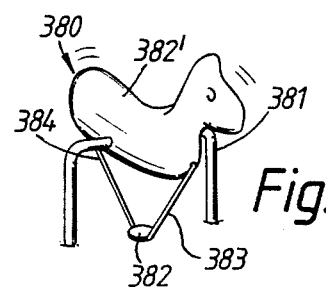

FIG. 14 shows a see-saw horse playground apparatus 380 in which a rigid ground mounted frame in the form of an inverted "U" 381, with the cross-piece of the "U" being straight, and a restraining portion 382 is used to mount a ridable body 382. The cross-piece of the "U" passes through the body 382 close to the centre of the body to provide a pivotal mounting for the body. Two sections 383 and 384 of the suspension chain described earlier are connected respectively from the restraining portion 382 to the front and back of the body 383 to serve as stop members to limit the degree of pivotal movement.

Figure 15:
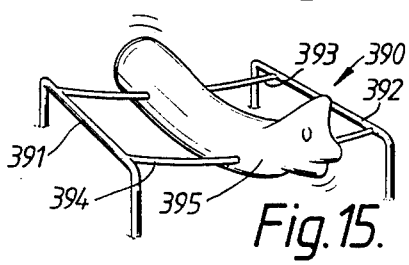

FIG. 15 shows a see-saw animal playground apparatus 390 in which a rigid ground mounted frame in the form of two inverted "U"-shaped members 391 and 392, with the cross-piece of the "U" being straight, is used with two sections 393 and 394 of the suspension chain described earlier to mount a ridable animal-like body 395. The sections 393 and 394 run in parallel from the member 391 to the member 392 and pass through the front and rear of the body 395 respectively, so constituting a movable mounting for it.

Figure 16:
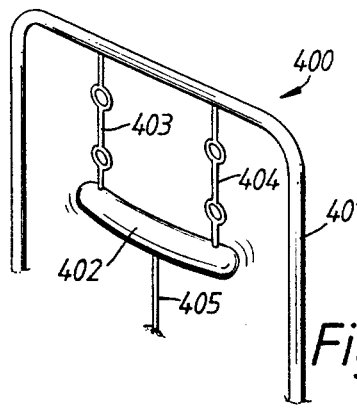

FIG. 16 shows a swing 400 in which a rigid ground mounted frame 401 in the form of an inverted "U", with the cross-piece of the "U" being straight is used with sections of the suspension chain described earlier to mount a swing seat 402. Here the sections of suspension chain are used not only to provide a pair of vertical suspensions 403, 404 between the top of the frame and each side of the seat 402 but a further section 405 is attached between the center of the underneath of the seat and the ground. The seat 402 is thus mounted for resilient displacement up and down, clockwise and counter-clockwise, side to side and back and forth.

Figure 17:
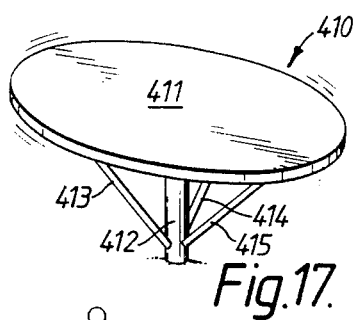

FIG. 17 shows a swinging disk playground apparatus 410 in which a disk 411 is freely mounted on a rigid grounted mounted frame in the form of a vertical post 412. Three sections 413, 414 and 415 of the suspension chain described earlier are connected between the underneath of the disk 411 at its periphery to the base of the post 412. The disk is thus mounted for resilient displacement with a rocking or swinging movement.

Figure 18:
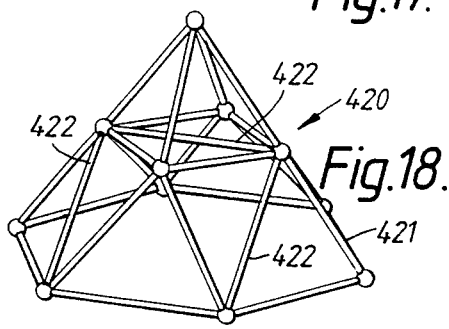

FIG. 18 shows a climbing frame 420 in which a rigid ground mounted frame 421 in the form of a geodesic structure has sections 422 of the suspension chain described earlier connected between selected nodes of the geodesic structure.

Figure 19:
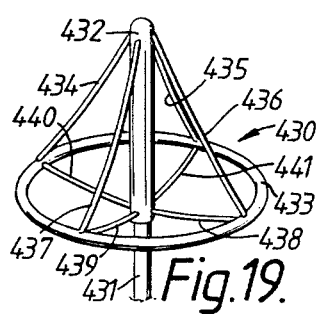

FIG. 19 shows a swinging roundabout 430 in which a rigid ground mounted frame 431 in the form of a post with a rotatable top section 432 is used with sections of the suspension chain described earlier to mount a ring-shaped bench 433. The sections of suspension chain comprise four section 434, 435, 436 and 437 connected from the top of the frame 431 to the bench 433 and four sections 438, 439, 440 and 441 connected from the bench to the frame 431 beneath the bench.

I claim:

1. Apparatus for use in a children's playground, the apparatus comprising a rigid ground-mountable frame and at least one chain having an end attached to the frame, wherein the at least one chain is a chain embedded in a resilient polymeric material and the disposition of the links of the chain is such as to permit the chain and polymeric material structure to stretch resiliently under load.

2. Playground apparatus as claimed in claim 1, wherein those ends, which lie within respective adjacent links, of at least some of the links in the chain are spaced from the adjacent links to permit the chain and polymeric material structure to stretch resiliently under load.

3. Playground apparatus as claimed in claim 2, wherein the chain comprises a series of simple links.

4. Playground apparatus as claimed in claim 3, wherein the chain is made of metal.

5. Playground apparatus as claimed claim 4, wherein the polymeric material is a moulded rubber material.

6. Playground apparatus as claimed claim 1, wherein the apparatus is a swing and comprises a rigid body suspended from the frame by the at least one embedded chain.

7. Playground apparatus as claimed in claim 1, wherein the apparatus is a climbing frame and comprises at least one embedded chain as defined in that claim mounted on the frame.

8. Playground apparatus as claimed in claim 1, wherein the apparatus includes a ladder-like structure of which the rungs are made of the embedded chain as defined in that claim.

9. Playground apparatus as claimed in claim 1, wherein the apparatus comprises a rigid body pivotally-mounted on the frame, and stop members to limit the movement of the body comprising lengths of the embedded chain as defined in that claim are provided.

10. Playground apparatus as claimed in claim 1, comprising a ridable body mounted on the frame by lengths of the embedded chain as defined in that claim.

11. Playground apparatus as claimed in claim 1, wherein the apparatus comprises a body mounted on the frame as a trampoline or spring-board by lengths of the embedded chain as defined in that claim.

12. A safety structure for use as a safety net comprising a web of resilient polymeric material, in which chains are embedded in the polymeric material, the disposition of the links of the chains being such as to permit the structure to stretch resiliently under load.

13. A safety structure as claimed in claim 12, wherein the ends of the chains project from the web and provide a means for suspension of the safety structure.

14. A safety structure as claimed in claim 12, wherein those ends, which lie within respective adjacent links, of at least some of the links in the chain are spaced from the said adjacent links to permit the structure to stretch resiliently under load.

15. A safety structure as claimed in claim 12, wherein a first set of parallel chains crosses a second set of parallel chains and the two sets are interlinked at the crossing points.

16. A safety structure as claimed in claim 15, wherein the two sets of chains are arranged substantially at right angles.

17. A safety structure as claimed in claim 15, wherein at each crossing point a ring-shaped link is provided and those ends, within the ring-shaped link, of the adjacent links are spaced from the ring-shaped link.

18. A safety structure as claimed in claim 17, wherein the said links adjacent to the ring-shaped links are linked one to the next by one or more links smaller than the said links adjacent to the ring-shaped links.

19. A safety structure as claimed in claim 12, wherein the web is apertured in the spaces between chains.

20. A safety structure as claimed in claim 12, wherein the web is apertured within the ring-shaped links.

* * * * *

UNITED STATES PATENT AND TRADEMARK OFFICE
CERTIFICATE OF CORRECTION

PATENT NO. : 4,943,046
DATED : July 24, 1990
INVENTOR(S) : Gunter Beltzig

It is certified that error appears in the above-identified patent and that said Letters Patent is hereby corrected as shown below:

Column 5, line 14, after "forced" insert --through an aperture of the Figure 2 safety structure--.

Signed and Sealed this

Seventeenth Day of December, 1991

Attest:

HARRY F. MANBECK, JR.

*Attesting Officer*  *Commissioner of Patents and Trademarks*